United States Patent [19]

Telamo

[11] Patent Number: 4,806,738
[45] Date of Patent: Feb. 21, 1989

[54] ELECTRIC PLATE

[76] Inventor: Erkki Telamo, Viitastentie, SF-01810 Luhtajoki, Finland

[21] Appl. No.: 94,509

[22] Filed: Sep. 9, 1987

[30] Foreign Application Priority Data

Mar. 12, 1987 [FI] Finland ................................ 871077

[51] Int. Cl.$^4$ .............................................. H05B 3/74
[52] U.S. Cl. .................................... 219/457; 219/462; 219/464; 219/345
[58] Field of Search ............... 219/457, 464, 462, 463, 219/458, 459, 378, 345, 542; 126/400

[56] References Cited

U.S. PATENT DOCUMENTS 4,258,695 3/1981 McCarton ........................... 126/400

FOREIGN PATENT DOCUMENTS 404555 1/1934 United Kingdom ................ 219/462
436696 10/1935 United Kingdom ................ 219/457

*Primary Examiner*—Teresa J. Walberg
*Attorney, Agent, or Firm*—McGlew and Tuttle

[57] ABSTRACT

An electric plate includes a plate in connection with which there is arranged at least one electric resistor and to a control for switching it on and for adjusting its power. The plate is composed of soap rock and around it there is arranged a straining strap made of steel band. The plate is provided with a narrow and deep slot in which there is arranged the electric resistor and the slot is filled at least partly with refractory mortar.

3 Claims, 1 Drawing Sheet

ELECTRIC PLATE

BACKGROUND OF THE INVENTION

The present invention relates to an electric plate comprising a plate in connection with which there is arranged at least one electric resistor to which switching and control means are coupled for switching the electric resistor on an electric source and for adjusting its power.

It has been previously known different types of electric plates, in which the plates are formed with appropriate metal or alloy. A disadvantage in these electric plates is, that the plate surface is sensitive to humidity and, in general, substances normally used during preparing food. Without care and repeating cleansing the plate surface is susceptible to get rusty, corroded or is generally damaged.

SUMMARY OF THE INVENTION

One object of the invention is to eliminate the aforementioned disadvantages and to provide a new type of an electric plate. To achieve this object the electric plate according to the invention is characterized in that the plate is composed of soapstone.

As advantages of the invention it could be appreciated, that since the plate being manufactured of soapstone, it will demand less care and can be utilized directly for grilling, roasting or warming up. The plate surface is solid in order to prevent drippings from being absorbed into it.

BRIEF DESCRIPTION OF THE DRAWINGS

The invention will now be described in more detail with reference to the accompanying drawings, in which.

DESCRIPTION OF PREFERRED EMBODIMENTS

Figure 1:
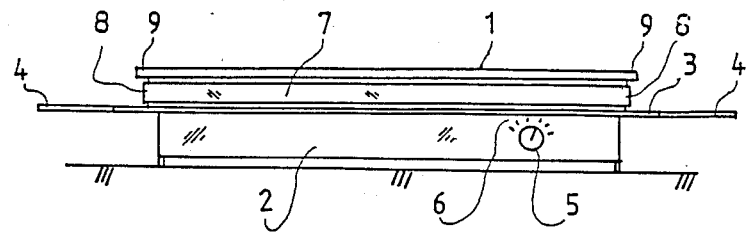
FIG. 1 shows a side view of an electric plate according to the invention.
Figure 2:
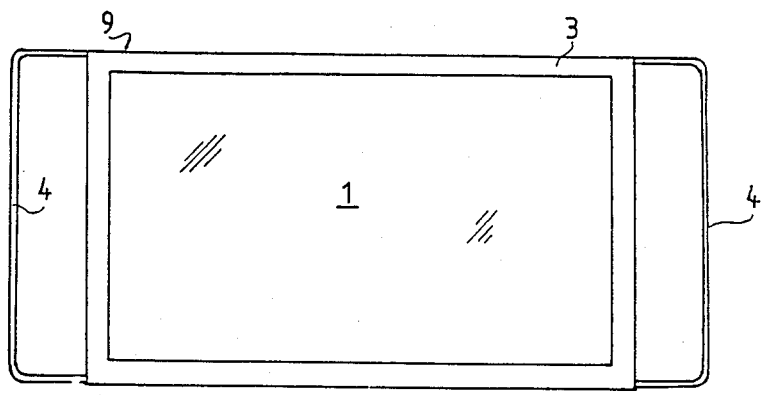
FIG. 2 shows the electric plate seen from above.

The electric plate of FIGS. 1 and 2 according to the invention comprises the actual plate 1 and a body member 2, on which the plate 1 is fitted in this embodiment. The plate 1 is surrounded by an edging 3, preventing e.g. drippings from running down the plate directly to a base. Attached to the body member 2 there are grips 4 to facilitate displacement of the electric plate. In connection with the plate 1 there is positioned at least one electric resistor. Switching and control means are arranged inside the body member 2 for switching the electric resistor on an electric resource, generally to the normal electrical network, and for its power control. On one side of the body member 2 there is a controller 5 by means of which, a desired temperature of the plate, e. g. from 50 C. to 200 C., and the power to be used, at a maximum e. g. 1.5 kW, can be chosen in accordance with a scale 6. The switching and control means are not described here in detail because the invention is not directed to these means and because they can be constructed in many ways e.g. known in the prior art.

The plate 1 is composed of soapstone. Soapstone is a greyish alteration product of species of rock containing very little silicon acid, including talcum and magnesite or dolomite. It can be readily machined, as well as enduring acids and alkalis and also heat to some extent.

A straining strap 7 is arranged around the plate 1. It is made of heat-resistant, only slightly tensile material, such as steel band. The edging of the plate 1 is preferably provided with a slot or a groove for the straining strap 7. Thus the strap 7 will be covered under the outer edge 9 of the plate 1. The straining strap 7 prevents the soapstone plate 1 from being broken up under the influence of recurring strong changes of temperature, i.e. continuing use. Furthermore by means of the strap 7 thermal radiation is hindered from being directed laterally from the plate 1.

Figure 3:
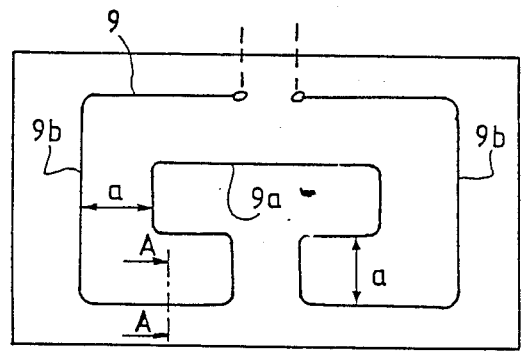
FIG. 3 shows the plate seen from beneath.

FIG. 3 shows how the electric resistor is fitted in the plate 1. Seen from beneath, there is a relatively narrow and deep slot 9 arranged in the plate 1. The depth s of the slot 9 is for example half of the thickness p of the plate 1 and the width k is one third of the depth. It will be obvious, that these values are only advisory and considerable deviations from these values can be made without observing any essensial changes in the operation of the electric plate.

Figure 4:
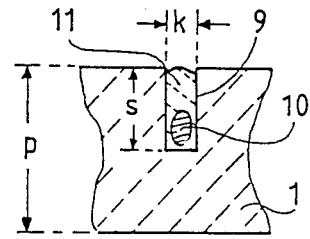
FIG. 4 shows a cross section A—A of the plate in FIG. 3.

The electric resistor 10, preferably threadlike, is located in the slot 9 and the slot is filled, at least partly, with refractory mortar 11, as shown in FIG. 4.

The slot 9 is arranged to surround the plate 1 as two parallel slots 9a, 9b with intervening space a between them and being associated with each other. Preferably the intervening space a is a constant but it can also vary. The purpose is, that the slot 9, and the electric resistor 10 fitted in it, would cover the area of the plate 1, in which case the heat given by the resistor 10 should spread evenly all over the plate 1.

We claim:

1. An electric plate comprising a soapstone plate having a thickness and a top flat cooking surface, a resistance element groove formed in a continuous path in said soapstone plate with portions which are spaced apart from each other and from the edges of said plate, said groove being at a depth of at least half the thickness of said plate and being located in a lower surface of said plate an electric heating resistance in said groove, a refractory material covering said heating resistance, and a straining strap extending around said plate.

2. The device as defined in claim 1 wherein the straining strap is made of steel band.

3. The device as defined in claim 1 wherein the groove is arranged to surround the plate as two parallel grooves with intervening space between them.

* * * * *